Sept. 17, 1957   A. A. ARBETTER   2,806,227
DISPOSABLE SINK MAT AND GARBAGE WRAPPER
Filed Jan. 28, 1955
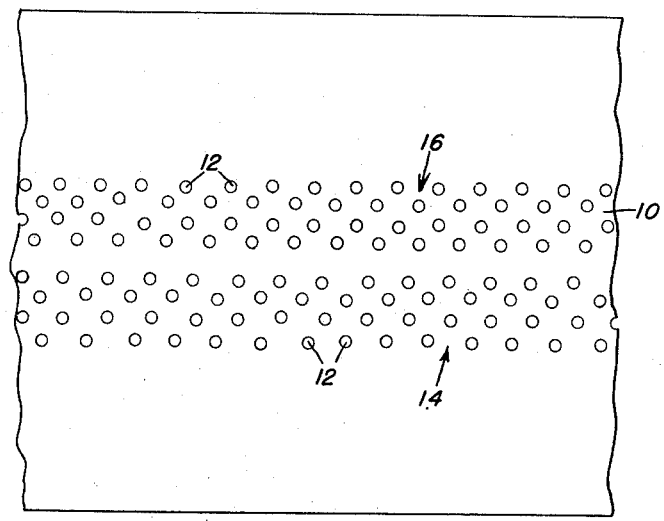
FIG. 1
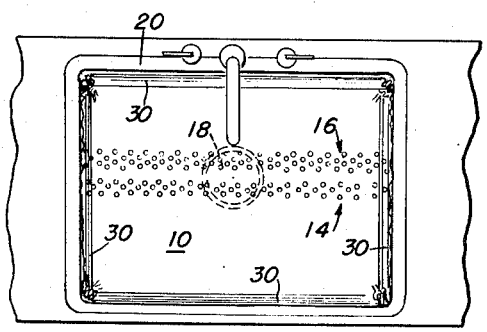
FIG. 2
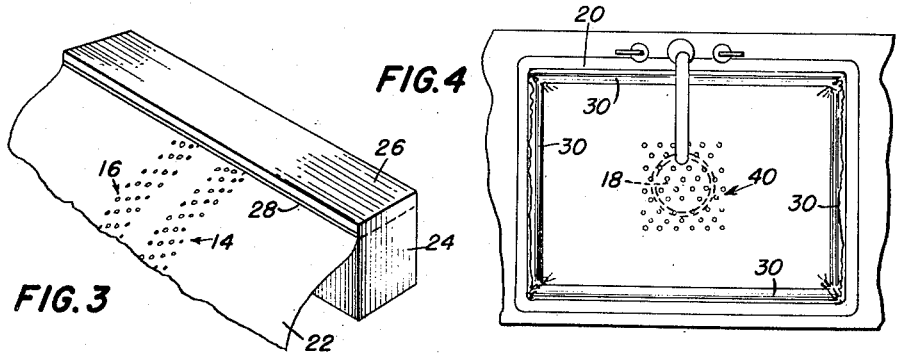
FIG. 4
FIG. 3
INVENTOR
ABEL A. ARBETTER
BY *Gustave Miller*
ATTORNEY

United States Patent Office 2,806,227
Patented Sept. 17, 1957

2,806,227
DISPOSABLE SINK MAT AND GARBAGE WRAPPER

Abel A. Arbetter, Chicago, Ill., assignor to Gustave Miller, Washington, D. C.

Application January 28, 1955, Serial No. 484,725

2 Claims. (Cl. 4—187)

This invention relates to a protective cover for sink bowls and the like, and it particularly relates to protective cover of the disposable type which protects the sink against silverware and pot marks, this saving a good deal of scouring and also acts to accumulate the garbage thereon and then acts as a wrapper for disposing of the garbage.

When washing eating utensils such as dishes, pots, glasses, silverware or the like, the friction of the utensils against the enamel of the sink tends to leave silverware and pot marks on the enamel. It has also been found that the soaps and detergents as well as the acids from the waste foods tend to discolor the enamel. Another problem is the fact that when handling the utensils, and especially relatively fragile articles such as china or glassware, an inadvertent slip, however slight, may result in breakage. On the other hand, any cushioning material, however slight the cushioning effect may be, would possibly prevent such breakage.

A further problem involves the disposal of food trimmings and waste and other garbage and waste products, such as the result from preparing food, washing potatoes, carrots and other vegetables and trimmings that accumulate during the preparation of food as well as from being scraped from dishes and pots during washing into the sink. These particles must be removed from the sink in order to prevent clogging of the sink drain and this must generally be done by hand. This is a messy, unsavory process which should be avoided if possible, and this liner acts both as a garbage trap and a garbage wrapper in removing and disposing of the garbage that has accumulated thereon.

In order to overcome the above disadvantages, it is one object of the present invention to provide a protective cover for a sink bowl which is adapted to prevent marking of the sink by the utensils being washed, and also to act as a garbage wrapper for the garbage accumulated in the sink thereon.

Another object of the present invention is to provide a protective cover for sink bowls which is capable of permitting drainage to take place, while accumulating the garbage for ready wrapping and disposal.

Another object of the present invention is to provide a protective cover for sink bowls which is adapted to substantially cushion articles being washed within the sink.

Another object of the present invention is to provide a protective cover for sink bowls which is sufficiently inexpensive to be disposable.

Other objects of the present invention are to provide an improved cover for sink bowls, of the character described, that is easily and economically produced, which is sturdy in construction, and which is highly efficient in operation.

With the above and related objects in view, this invention consists in the details of construction and combination of parts as will be more fully understood from the following description, when read in conjunction with the accompanying drawing in which:

Fig. 1 is a fragmentary elevational view of a protective cover embodying the present invention.

Fig. 2 is a top plan view of a sink showing the protective cover of Fig. 1 in position at the bottom and side edges of the sink bowl.

Fig. 3 is a perspective view of a dispenser from which projects a strip of material from which protective covers embodying the present invention may be cut.

Fig. 4 shows a modified form of liner.

Referring now in greater detail to the drawing wherein similar reference characters refer to similar parts, there is shown a cover 10 made of sheet material which is preferably flexible, somewhat resilient and inexpensive. Suitable material having good wet strength may include waxed paper and paper coated with synthetic resin type coatings. It is also possible to use aluminum foil or any of the flexible plastics.

The cover 10 is provided with a plurality of perforations 12 which as shown may be arranged in a double set of perforations such as at 14 and 16. In the cover 10, the two sets of perforations extend through the length of the sheet at the central area thereof. By being positioned in the center of the sheet, the perforations are adapted to overlie the drain opening of a sink in which the cover is positioned. This is shown in Fig. 2 where the perforations are shown overlying the drain opening 18 of a sink 20. The remainder of the sheet 10 is imperforate so that food trimmings such as potato peelings, pods, etc. removed from food during the preparation thereof, and other garbage or refuse, scraped or washed off the utensils, which fall onto the cover 10, may be gathered up within the sheet 10 which may be balled or rolled up at the end of the dishwashing operation. The whole may then be deposited in a refuse disposal container.

The cover sheet 10 with its double series of perforations 14 and 16 is preferably cut or torn from an elongated strip 22 rolled up into a roll and positioned within a dispensing container 24 having a hinged lid 26 with a cutting edge 28. To dispense the sheet, the end of the strip is grasped, pulled out to the desired length, and torn away at the cutting edge 28. The torn off portion becomes the cover sheet 10 which is then placed on the bottom of and side edges of the sink are fully covered. It should be noted that the rows of perforations 14 and 16 extend throughout the length of the strip 22 so that wherever a portion of the strip is cut or torn off, the resulting cover sheet will have the perforations in the center thereof. It should additionally be noted that although two spaced rows of perforations 14 and 16 are illustrated, it is within the scope of the invention to arrange the perforations in a single row or in any plurality of rows.

It is furthermore, possible to construct the strip 22 with a series of spaced lateral lines of weakness, such as a line of perforations. In this manner, the container with the cutting edge may be dispensed with and the rolled up strip may be set within a wall bracket or the like in the manner of ordinary paper toweling. The sheets 10 may also be individually manufactured and stacked in layers either within or without a container. In the two latter cases, either where the strip is divided into separate sheets connected by lines of weakness, or where the sheets 40 are completely separate from each other, a central pattern 42 such as a circle, a square, rectangle, or the like, may be substituted in each sheet for the continuous rows 14 and 16 of perforations shown in the drawing (Figs. 2 and 3). Such separate central pattern of perforations 42 may be only large enough to overlie the drain opening 18 in the sink 20. It is possible to have such central patterns 42 in the definitely defined sheets 40 because each sheet 40 is an entity in itself and does not depend on where a portion of the strip is torn or cut off.

It is also possible to completely perforate the sheet or strip so that drainage can occur throughout instead of only in the central portion. Although this construction would provide better and more complete drainage, it would tend to make for excessive leakage when the sheet is gathered up with the refuse therein.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. For use with a sink having a basin with a drain opening therein, an inexpensive flexible mat of disposable wet-strength sheet material arranged to overlie the entire bottom surface of said basin, a plurality of small, spaced-apart strainer perforations in said mat, at least some of said spaced-apart perforations being adapted to overlie the drain opening.

2. For use with a sink having a basin with a drain opening therein, an inexpensive flexible mat of disposable, wet-strength paper sheet material arranged to overlie the entire bottom surface of said basin, a plurality of small, spaced-apart strainer perforations in said mat, at least some of said spaced-apart strainer perforations being adapted to overlie the drain opening.

References Cited in the file of this patent
UNITED STATES PATENTS

| | | |
|---|---|---|
| 233,674 | Hayes | Oct. 26, 1880 |
| 399,321 | Esmond | Mar. 12, 1889 |
| 1,524,960 | Adams | Feb. 3, 1925 |
| 1,865,459 | Edmonds | July 5, 1932 |
| 1,887,200 | Hand | Nov. 8, 1932 |
| 2,025,281 | Harvey | Dec. 24, 1935 |
| 2,271,579 | Wright | Feb. 3, 1942 |
| 2,426,025 | Justin | Aug. 19, 1947 |
| 2,634,252 | Gerue et al. | Apr. 21, 1953 |